(12) United States Patent
Chhajer et al.

(10) Patent No.: US 8,156,421 B2
(45) Date of Patent: Apr. 10, 2012

(54) ANALYSIS OF DATABASE PERFORMANCE REPORTS FOR GRAPHICAL PRESENTATION OF SUMMARY RESULTS

(75) Inventors: Ritesh Rajkaran Chhajer, Sunnyvale, CA (US); Satish Mehta, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 799 days.

(21) Appl. No.: 12/165,552

(22) Filed: Jun. 30, 2008

(65) Prior Publication Data

US 2009/0327854 A1    Dec. 31, 2009

(51) Int. Cl.
*G06F 17/00* (2006.01)
(52) U.S. Cl. .................................................. 715/227
(58) Field of Classification Search .................. 715/227
See application file for complete search history.

(56) References Cited

U.S. PATENT DOCUMENTS

| | | | |
|---|---|---|---|
| 6,052,694 A * | 4/2000 | Bromberg ........................... | 1/1 |
| 7,185,016 B1 * | 2/2007 | Rasmussen ......................... | 1/1 |
| 2002/0178161 A1 * | 11/2002 | Brezin et al. ..................... | 707/10 |
| 2003/0110153 A1 * | 6/2003 | Shee ................................. | 707/1 |
| 2004/0169654 A1 * | 9/2004 | Walker et al. .................. | 345/440 |
| 2005/0086263 A1 * | 4/2005 | Ngai et al. ................... | 707/104.1 |
| 2006/0059205 A1 * | 3/2006 | Shah et al. ..................... | 707/200 |
| 2006/0106851 A1 * | 5/2006 | Warshawsky ................. | 707/101 |
| 2006/0112135 A1 * | 5/2006 | Warshawsky ................. | 707/102 |

* cited by examiner

*Primary Examiner* — Doug Hutton, Jr.
*Assistant Examiner* — Andrew McIntosh
(74) *Attorney, Agent, or Firm* — Martine Penilla Group, LLP

(57) ABSTRACT

Computer implemented methods, programs and systems for displaying statistical data in a graphical user interface are provided. According to the method, baseline data is imported from a first report which corresponds to a trouble-free period. Similarly, critical data is imported from a second report corresponding to a trouble period. The imported data is compared and analyzed to create a results table, each cell in the results table corresponding to a timestamp and a statistical item. The cells in the results table contain a visual identifier according to the criticality of the comparison of the statistical items from the baseline data and the critical data. The results table is presented on a display to the user.

18 Claims, 8 Drawing Sheets

SNAPSHOT TABLE

| snapshot id | end interval time | stat 1 | stat 2 | stat 3 |
|---|---|---|---|---|
| snap_345 | 090109145030 | 29<br>28<br>54 | 0.24<br>0.23<br>0.24<br>0.28<br>0.29 | 4 |
| snap_346 | 090109145530 | 29<br>31<br>31 | 0.24<br>0.24<br>0.89<br>0.70<br>0.24 | 4 |
| snap_347 | 090109150030 | 28<br>28<br>27 | 0.24<br>0.24<br>0.20<br>0.20<br>0.22 | 5 |
|  |  |  |  |  |
|  |  |  |  |  |

Fig. 2

ANALYSIS OF DATABASE PERFORMANCE REPORTS FOR GRAPHICAL PRESENTATION OF SUMMARY RESULTS

BACKGROUND

1. Field of the Invention

The present invention relates to methods for improving problem determination, and more particularly, methods, computer program and systems for analyzing database performance reports and summarizing information.

2. Description of the Related Art

Problem diagnosis in a distributed database environment is a challenging task for multiple reasons, namely having too little or too much information about the database, problems occurring at multiple nodes, inability to examine the problem as it happens, etc. Typically, a database system collects system information during normal operation. Often, problems appear for a limited amount of time to disappear before being diagnosed only to reappear again in the future. A slow response time is one such example. By the time the problem is reported and the database engineer begins problem diagnosis, the problem has disappeared and reliance on logged system information is a must.

Unfortunately, system information in the form of a database performance report is usually very extensive and finding the problem requires a large amount of time. Since a large amount of data must be analyzed, the diagnosis engineer must spend considerable effort to look at logged data, without an easy way of knowing if the logged data is within an acceptable range. Moreover, information obtained from different nodes has to be correlated sometimes, as one problem source can affect different nodes, such as a faulty network switch. This only compounds the problem and increases the time required for problem resolution.

It is in this context that embodiments of the invention arise.

SUMMARY

Embodiments of the present invention provide methods, computer programs, and systems for displaying statistical data in a graphical user interface. According to the method, baseline data is imported from a first report and critical data is imported from a second report. The first report corresponds to a trouble-free period with no identified problems in the performance of the system, and the second report corresponds to a trouble period where occurrence of a problem has been identified. The method also includes creating a results table organized by timestamps and statistical items. Each cell in the table contains a visual identifier corresponding to a criticality of a comparison of the statistical items from the baseline and the critical data in that cell. The results table is presented on a display to a user. In one embodiment, the method's operations are performed by a computer program.

It should be appreciated that the present invention can be implemented in numerous ways, such as a process, an apparatus, a system, a device or a method on a computer readable medium. Several inventive embodiments of the present invention are described below.

In one embodiment, a system for displaying statistical data in a graphical user interface is provided. The system includes a computer device having a processor, and a memory. The memory includes a first report with baseline database data, a second report covering a trouble period, and a report analysis program. The report analysis program creates a results table in the memory organized by timestamp and statistical items. Each cell in the results table contains a visual identifier corresponding to a criticality of a comparison of the statistical items from the baseline and the critical data in the cell. The report analysis program presents the results table on a display for a user.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 2 shows a simplified representation of a snapshot table, according to one embodiment.

DETAILED DESCRIPTION

Computer implemented methods, programs and systems for displaying statistical data in a graphical user interface are provided. According to the method, baseline data is imported from a first report which corresponds to a trouble-free period where the system is operating satisfactorily. Critical data is imported from a second report corresponding to a trouble period that has been identified as encompassing one or more performance problems. The imported data is compared and analyzed to create a results table, each cell in the results table corresponding to a timestamp and a statistical item. The cells in the results table contain a visual identifier according to the criticality of the comparison of the statistical items from the baseline data and the critical data. The results table is presented on a display to the user in a graphical manner for easy access.

The following embodiments describe a method and apparatus for displaying statistical data in a graphical user interface. It will be obvious, however, to one skilled in the art, that the present invention may be practiced without some or all of these specific details. In other instances, well known process operations have not been described in detail in order not to unnecessarily obscure the present invention.

Figure 1:
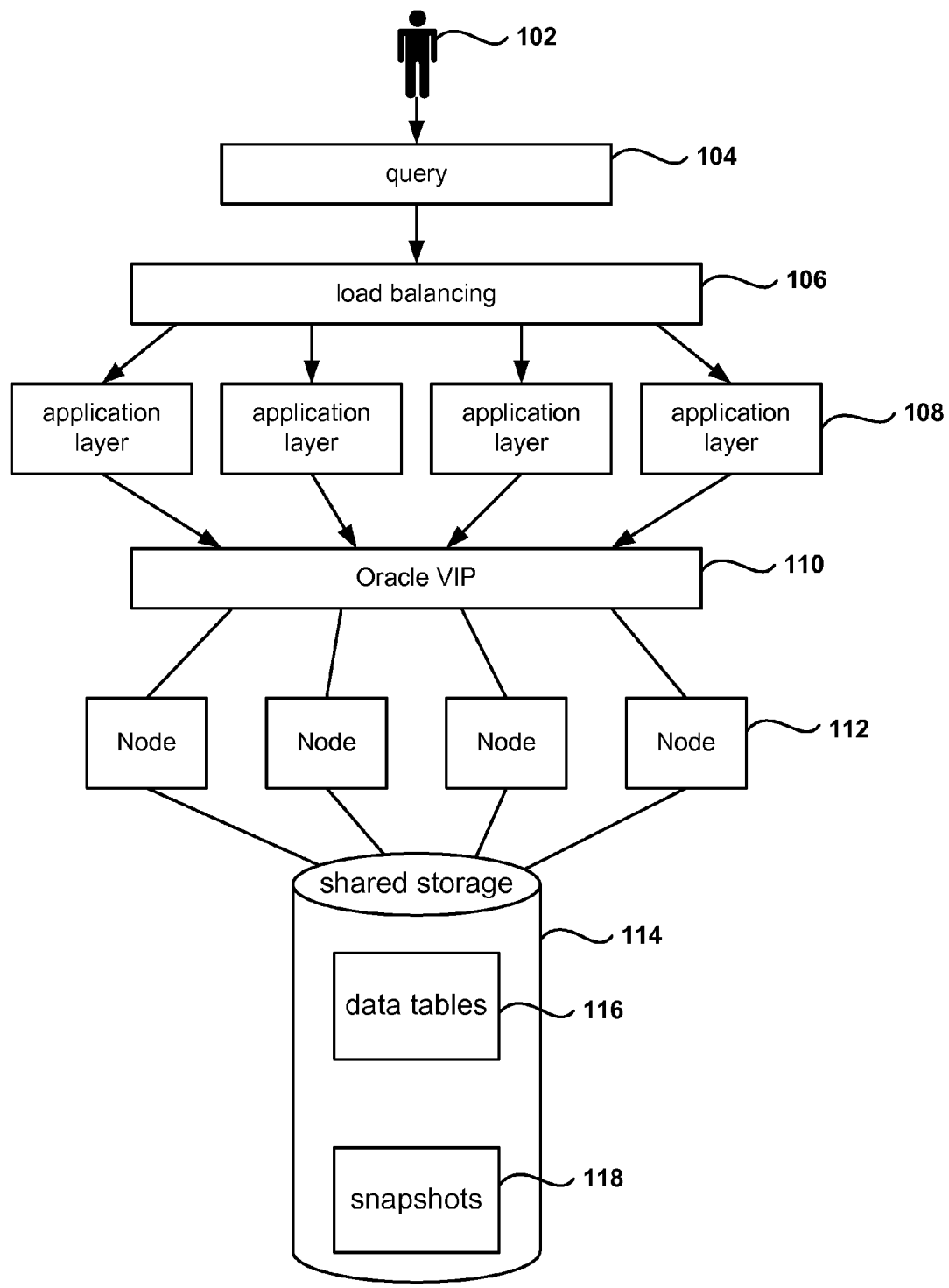
FIG. 1 depicts a database computer environment for one embodiment of the invention.

FIG. 1 depicts a database computer environment for one embodiment of the invention. For description purposes, an Oracle® database is used, but the embodiments of the present invention can be used with any other database. Database user 102 generates query 104 to access the data in the Oracle database. Typically, load balancing module 106 is used to assign the user to different systems, according to the load of the different elements of the database. Load balancing 106 assigns an application layer 108 that connects to the different nodes 112 in the cluster via Oracle's Virtual Internet Protocol (VIP). Nodes 112 in the cluster have access to the same shared storage 114, which holds data tables 116 as well as the collection of statistics from the database kept in snapshots 118.

In Oracle® 10g database, the statistics collected are called snapshots, point-in-time collections of the available statistics. Each snapshot is given a snapshot id (identifier) value to uniquely identify each snapshot. The degree of snapshot collection can be changed by the user to collect snapshots at different levels of resolution. The use of a sequence in giving snapshots an id is important since a single snapshot is not very useful on its own. A snapshot is basically a capture of the current values of the database statistics, most of which have been monotonically increasing since the database instance was started. This dependency between consecutive snapshots can be thought of as snapshot stream. There is only one snapshot stream in a database.

FIG. 2 shows a simplified representation of a snapshot table, according to one embodiment. Each row in the snapshot table represents a snapshot and contains the snapshot id (e.g.: snap_345), a timestamp or end interval time (e.g. 090109145030), and the different statistics captured. There are different types of statistics. The most basic type of statistic is a counter statistic. Counter statistics monotonically increase through time and only require two end point values to calculate its value over a period of time. Another type of statistic is a value statistic. A value statistic indicates the current outstanding amount of some item and can move up or down through time. For example, the total amount of private memory allocated to processes in the database system is tracked by a value statistic. The next type of statistic is a time statistic. Time statistics represent the difference in values recorded against timers during an operation. Example timers are the wall clock timer and the CPU timer. An example of a timer statistic would be "DB CPU" which represents the change in the CPU timer on the system while database calls are active. Having the value of a time statistic at both end points of a time period reflects the amount of time taken during the time period.

Another type of statistic is the metric statistic, which is a composite of counter, value, and time statistics. Metrics represent ratios of statistics over small intervals of time. For example, there is a metric defined for database buffer gets per database transaction over a one minute interval. The implementation of metrics requires periodic (frequency being the interval time) capture of statistic values into memory. Finally, the sampled statistic type is based on taking periodic samples of statistic values or current state. For example, sampled data can be used to estimate the time spent executing a particular SQL statement on the system.

An important type of statistic for problem resolution in Oracle databases is the wait event statistic. A wait event is a situation when a session puts itself to sleep to wait for some external event to happen. Examples are waiting for a shared lock to be released or waiting for an I/O request to complete. Typically, any significant amount of time spent in wait events indicates a system problem unless the wait event is either an idle wait or a service wait. Idle wait events occur when a session is waiting for a work request to be issued. For example, while a session is waiting for the next request from the end user, the session waits on an idle wait event. Service wait events are waits for the system to perform asynchronous operations such as I/O or process creation.

Table 1 shows anon-comprehensive list of wait events available in the Oracle 10g database.

TABLE 1

Figure 3:
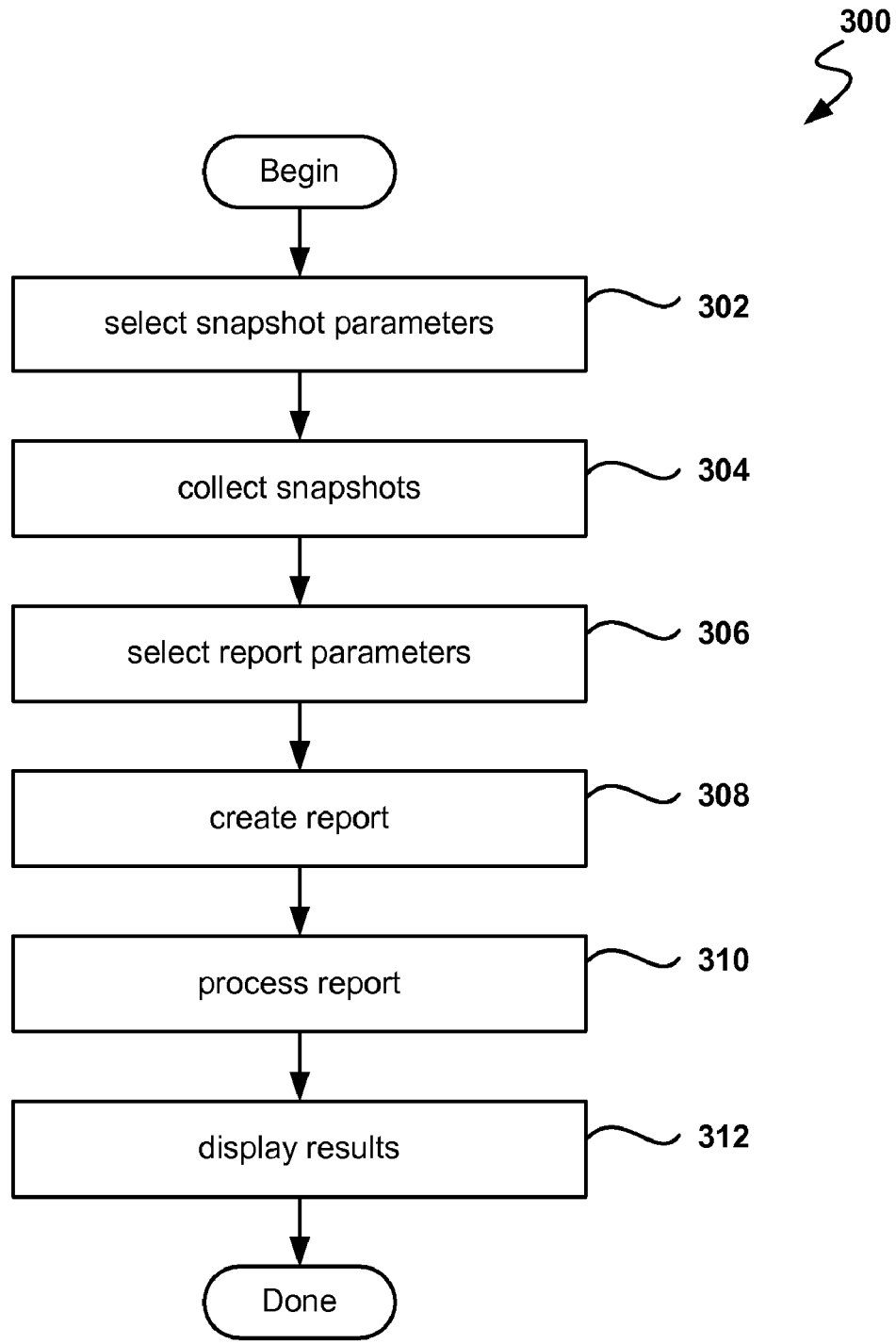
FIG. 3 describes a problem diagnosis process for one embodiment of the invention.

Oracle 10 g Wait Events:

ARCH random i/o
ARCH sequential i/o
ARCH wait for archivelog lock
ARCH wait for flow-control
ARCH wait for net re-connect
ARCH wait for netserver detach
ARCH wait for netserver init 1
ARCH wait for netserver start
ARCH wait for pending I/Os
ARCH wait for process death 1
ARCH wait for process death 2
ASM COD rollback operation completion
ASM PST query : wait for [PM][grp][0] grant
ASM background running
ASM background starting
ASM background timer
AWR Flush
AWR Metric Capture
BFILE check if exists
BFILE check if open
BFILE closure
Backup: sbtbackup
Backup: sbtclose
Backup: sbtend
Backup: sbterror
Backup: sbtinfo
Backup: sbtopen
Backup: sbtpcbackup
EMON idle wait
FAL archive wait 1 sec for REOPEN minimum
GCS lock cancel
GCS lock cvt S
GCS lock esc
IPC busy async request
IPC send completion sync
IPC wait for name service busy
IPC waiting for OSD resources
JS coord start wait
JS external job
KJC: Wait for msg sends to complete
KSV master wait
Kupp process shutdown
L1 validation
LMON global data update
LNS ASYNC archive log
LNS ASYNC control file txn
LNS simulation latency wait
LNS wait for LGWR redo
Log archive I/O
Log file init write
LogMiner: client waiting for transaction
LogMiner: slave waiting for activate message
Logical Standby dictionary build
Logical Standby pin transaction
MMON slave messages
MRP wait on process death
MRP wait on process restart
OLAP Aggregate Client Deq
OLAP Aggregate Client Enq
OLAP Null PQ Reason
PMON to cleanup pseudo-branches at svc stop time
PX Deq Credit: free buffer
PX Deq Credit: need buffer
RF - FSFO Wait for Ack
RFS announce
RFS attach
RMAN backup & recovery I/O
RVWR wait for flashback copy
SGA: MMAN sleep for component shrink
SGA: allocation forcing component growth
SQL*Net message from client
SQL*Net message from dblink
Standby redo I/O
Streams AQ: RAC qmn coordinator idle wait
Streams AQ: delete acknowledged messages
Sync ASM rebalance
TCP Socket (KGAS)
TEXT: URL_DATASTORE network wait TABLE 1-continued Oracle 10 g Wait Events:

Wait for TT enqueue
Wait for Table Lock
Wait for shrink lock
affinity expansion in replay
alter rbs offline
alter system set dispatcher
block change tracking buffer space
buffer busy
change tracking file parallel write
check CPU wait times
checkpoint advanced
checkpoint completed
cleanup of aborted process
control file heartbeat
cr request retry
db file parallel read
db file sequential read
direct path read
direct path write temp
dma prepare busy
dupl. cluster key
enq: AD - allocate AU
enq: AD - deallocate AU
events in waitclass Other
extent map load/unlock
flashback buf free by RVWR
free buffer waits
free global transaction table entry
free process state object
gc assume
gc block recovery request
gc buffer busy
gc claim
gcs ddet enter server mode
gcs domain validation
gcs drm freeze begin
gcs remastering wait for read latch
gcs remastering wait for write latch
gcs remote message
gcs resource directory to be unfrozen
gcs to be enabled
ges LMD suspend for testing event
i/o slave wait
imm op
inactive session
inactive transaction branch
index (re)build online cleanup
index (re)build online merge
instance state change
io done
job scheduler coordinator slave wait
jobq slave TJ process wait
jobq slave shutdown wait
jobq slave wait
kdic_do_merge
kfcl: instance recovery
kfk: async disk IO
kgltwait
kjbdomalc allocate recovery domain - retry
kkdlgon
kkdlhpon
kkdlsipon
kksfbc child completion
kksfbc research
ksdxexeother
ksdxexeotherwait
ksfd: async disk IO
ksim generic wait event
ksqded
kst: async disk IO
ksv slave avail wait
ksxr poll remote instances
ksxr wait for mount shared
ktfbtgex
ktm: instance recovery
ktsambl
kttm2d
kupp process wait TABLE 1-continued Oracle 10 g Wait Events:

kxfxse
kxfxsp
latch activity
latch free
latch: Change Notification Hash table latch
latch: In memory undo latch
library cache load lock
lms flush message acks
local write wait
lock close
lock deadlock retry
log buffer space
log file parallel write
logout restrictor
master exit
multiple dbwriter suspend/resume for file offline
name-service call wait
opishd
optimizer stats update retry
os thread startup
parallel recovery coordinator waits for cleanup of slaves
pending global transaction(s)
pmon timer
prewarm transfer retry
prior spawner clean up
process shutdown
process startup
process terminate
qerex_gdml
queue slave messages
rdbms ipc message
rdbms ipc message block FIG. 3 describes a problem diagnosis process 300 for one embodiment of the invention. In operation 302 the parameters to be collected during database operation are selected. For example, frequency with which the parameters are collected and a list of wait events to be collected. In operation 304, the snapshots are collected during operation of the database, and parameters are collected to generate a report in operation 306. Typically, the report will cover a period of time define by beginning and ending times and will cover all the snapshots being collected from the database. In some cases, the user can define a subset of snapshots to use for the generation of the report. The graphical user interface (GUI) takes arguments, via a drop down box for example, to delimit the data to be processed. Additionally, the user can also enter the start date and end date of the data collected.

In one embodiment, the report is generated with the Automatic Workload Repository (AWR) tool in an Oracle 10g database environment. AWR obtains statistics by capturing the current values during a point in time in a snapshot. The default period is 60 minutes but the period can have any value greater than 10 minutes. The statistics collected by AWR are stored in the database. AWR also generates AWR reports that present the captured information. To analyze a particular period of time, two snapshots are compared and the values captured at the snapshots are used to perform the analysis. The type of the statistic determines how the data is analyzed. For example, a counter type statistic such as "database buffer gets" can be used by simply subtracting the value in the first snapshot from the value in the last to get a total for the time period.

An AWR report may include one or more of the following sections: report summary, cache sizes, load profile, instance efficiency percentages, shared pool statistics, top 5 timed events, wait events statistics, wait events, background wait events, time model statistics, operating system statistics, service statistics, SQL section, instance activity stats, I/O section, advisory section, buffer wait statistics, enqueue activity, undo segment stats, latch activity, segment information, dictionary cache, library cache, SGA memory summary, etc.

A baseline is defined as a range of snapshots that can be used to compare with other pairs of snapshots. If RAC (Real Application Clusters) are running, a separate AWR report must be obtained for each individual instance. An AWR report can be 40 pages or more. Table 2 shows a sample AWR Report.

TABLE 2

| WORKLOAD REPOSITORY report for | | | | | | |
|---|---|---|---|---|---|---|
| DB Name | DB Id | Instance | Inst Num | Release | RAC | Host |
| xxxx12 | 881902085 | xxxx121 | 1 | 10.2.0.2.0 | YES | xx-xx12-00 |

| | Snap Id | Snap Time | Sessions | Curs/Sess |
|---|---|---|---|---|
| Begin Snap: | 88148 | Jun. 03, 2008 03:00:06 | 136 | 36.5 |
| End Snap: | 88153 | Jun. 03, 2008 03:50:06 | 117 | 27.5 |
| Elapsed: | | 50.00 (mins) | | |
| DB Time: | | 444.31 (mins) | | |

| Cache Sizes | | | | |
|---|---|---|---|---|
| | Begin | End | | |
| Buffer Cache: | 22,528M | 22,528M | Std Block Size: | 8K |
| Shared Pool Size: | 3,072M | 3,072M | Log Buffer: | 63,500K |

| Load Profile | | |
|---|---|---|
| | Per Second | Per Transaction |
| Redo size: | 1,880,553.37 | 257,910.08 |
| Logical reads: | 310,161.95 | 42,537.42 |
| Block changes: | 13,673.13 | 1,875.21 |
| Physical reads: | 1,117.48 | 153.26 |
| Physical writes: | 589.02 | 80.78 |
| User calls: | 172.92 | 23.72 |
| Parses: | 136.71 | 18.75 |
| Hard parses: | 4.69 | 0.64 |
| Sorts: | 62.86 | 8.62 |
| Logons: | 0.70 | 0.10 |
| Executes: | 440.13 | 60.36 |
| Transactions: | 7.29 | |

| % Blocks changed per Read: | 4.41 | Recursive Call %: | 93.56 |
|---|---|---|---|
| Rollback per transaction %: | 2.77 | Rows per Sort: | 202.90 |

| Instance Efficiency Percentages (Target 100%) | | | |
|---|---|---|---|
| Buffer Nowait %: | 99.98 | Redo NoWait %: | 100.00 |
| Buffer Hit %: | 99.66 | In-memory Sort %: | 100.00 |
| Library Hit %: | 98.56 | Soft Parse %: | 96.57 |
| Execute to Parse %: | 68.94 | Latch Hit %: | 99.83 |
| Parse CPU to Parse Elapsd %: | 75.99 | % Non-Parse CPU: | 81.06 |

| Shared Pool Statistics | Begin | End |
|---|---|---|
| Memory Usage %: | 86.61 | 89.89 |
| % SQL with executions > 1: | 26.94 | 70.04 |
| % Memory for SQL w/exec > 1: | 15.00 | 65.19 |

| Top 5 Timed Events | | | | | |
|---|---|---|---|---|---|
| Event | Waits | Time (s) | (ms) | Avg wait Time | % Total Call Wait Class |
| db file sequential read | 1,328,665 | 9,262 | 7 | 34.7 | User I/O |
| CPU time | | 7,655 | | 28.7 | |
| PX Deq Credit: send blkd | 90,885 | 1,342 | 15 | 5.0 | Other |
| db file parallel read | 90,154 | 1,316 | 15 | 4.9 | User I/O |
| db file scattered read | 73,283 | 975 | 13 | 3.7 | User I/O |

RAC Statistics DB/Inst: xxxx12/xxxx121 Snaps: 88148-88153

TABLE 2-continued

WORKLOAD REPOSITORY report for

| | Begin | End |
|---|---|---|
| Number of Instances: | 6 | 6 |

Global Cache Load Profile

| | Per Second | Per Transaction |
|---|---|---|
| Global Cache blocks received: | 496.88 | 68.14 |
| Global Cache blocks served: | 857.20 | 117.56 |
| GCS/GES messages received: | 3,467.11 | 475.50 |
| GCS/GES messages sent: | 3,846.12 | 527.48 |
| DBWR Fusion writes: | 1.43 | 0.20 |
| Estd Interconnect traffic (KB) | 12,260.98 | |

Global Cache Efficiency Percentages (Target local + remote 100%)

| | |
|---|---|
| Buffer access - local cache %: | 99.50 |
| Buffer access - remote cache %: | 0.16 |
| Buffer access - disk %: | 0.34 |

Time Model Statistics DB/Inst: xxxx12/xxxx121 Snaps: 88148-88153
Total time in database user-calls (DB Time): 26658.6 s
Statistics including the word "background" measure background process time, and so do not contribute to the DB time statistic
Ordered by % or DB time desc, Statistic name

| Statistic Name | Time (s) | % of DB Time |
|---|---|---|
| sql execute elapsed time | 26,834.5 | 100.7 |
| DB CPU | 7,655.3 | 28.7 |
| parse time elapsed | 2,277.1 | 8.5 |
| hard parse elapsed time | 2,233.1 | 8.4 |
| PL/SQL execution elapsed time | 173.0 | .6 |
| hard parse (sharing criteria) elapsed time | 9.2 | .0 |
| PL/SQL compilation elapsed time | 6.5 | .0 |
| sequence load elapsed time | 3.3 | .0 |
| connection management call elapsed time | 2.8 | .0 |
| repeated bind elapsed time | 2.6 | .0 |
| failed parse elapsed time | 0.2 | .0 |
| hard parse (bind mismatch) elapsed time | 0.0 | .0 |
| DB time | 26,658.6 | N/A |
| background elapsed time | 3,607.8 | N/A |
| background cpu time | 1,040.9 | N/A |

Wait Class DB/Inst: xxxx12/xxxx121 Snaps: 88148-88153
s - second
cs - centisecond - 100th of a second
ms - millisecond - 1000th of a second
us - microsecond - 1000000th of a second
ordered by wait time desc, waits desc

| Wait Class | Waits | % Time-outs | Total Wait Time (s) | Avg wait (ms) | Waits/txn |
|---|---|---|---|---|---|
| User I/O | 1,640,966 | .0 | 12,217 | 7 | 75.0 |
| Cluster | 3,257,067 | .0 | 1,912 | 1 | 148.9 |
| Other | 6,361,695 | 93.0 | 1,880 | 0 | 290.8 |
| System I/O | 437,043 | .0 | 1,101 | 3 | 20.0 |
| Network | 478,025 | .0 | 953 | 2 | 21.9 |
| Concurrency | 494,358 | .1 | 460 | 1 | 22.6 |
| Commit | 16,441 | .1 | 114 | 7 | 0.8 |
| Application | 26,674 | .0 | 26 | 1 | 1.2 |
| Configuration | 27,434 | 95.7 | 2 | 0 | 1.3 |

Wait Events DB/Inst: xxxx12/xxxx121 Snaps: 88148-88153
s - second
cs - centisecond - 100th of a second
ms - millisecond - 1000th of a second
us - microsecond - 1000000th of a second
ordered by wait time desc, waits desc (idle events last)

| Event | Waits | % Time-outs | Total Wait Time (s) | Avg wait (ms) | Waits/txn |
|---|---|---|---|---|---|
| db file sequential read | 1,328,665 | .0 | 9,262 | 7 | 60.7 |
| PX Deq Credit: send blkd | 90,885 | .2 | 1,342 | 15 | 4.2 |
| db file parallel read | 90,154 | .0 | 1,316 | 15 | 4.1 |
| db file scattered read | 73,283 | .0 | 975 | 13 | 3.4 |

TABLE 2-continued

WORKLOAD REPOSITORY report for

| | | | | | |
|---|---|---|---|---|---|
| LNS wait on SENDREQ | 892 | .0 | 948 | 1063 | 0.0 |
| read by other session | 123,249 | .0 | 645 | 5 | 5.6 |
| db file parallel write | 135,512 | .0 | 610 | 5 | 6.2 |
| gc buffer busy | 75,721 | .2 | 448 | 6 | 3.5 |
| gc cr grant 2-way | 1,013,568 | .0 | 390 | 0 | 46.3 |
| enq: WF - contention | 645 | 90.9 | 289 | 449 | 0.0 |

Operating System Statistics DB/Inst: xxxx12/xxxx121 Snaps: 88148-88153

| Statistic | Total |
|---|---|
| BUSY_TIME | 935,464 |
| IDLE_TIME | 1,453,864 |
| IOWAIT_TIME | 3,886 |
| NICE_TIME | 8,805 |
| SYS_TIME | 164,958 |
| USER_TIME | 702,379 |
| LOAD | 4 |
| RSRC_MGR_CPU_WAIT_TIME | 0 |
| PHYSICAL_MEMORY_BYTES | 4,404,944 |
| NUM_CPUS | 8 |
| NUM_CPU_SOCKETS | 4 |

Service Wait Class Stats DB/Inst: xxxx12/xxxx121 Snaps: 88148-88153
Wait Class info for services in the Service Statistics section.
Total Waits and Time Waited displayed for the following wait classes: User I/O, Concurrency, Administrative, Network
Time Waited (Wt Time) in centisecond (100th of a second)

Service Name

| User I/O Total Wts | User I/O Wt Time | Concurcy Total Wts | Concurcy Wt Time | Admin Total Wts | Admin Wt Time | Network Ttl Wts | Network Wt Time |
|---|---|---|---|---|---|---|---|
| | | | xxxx12_copt_svc | | | | |
| 477560 | 406673 | 176668 | 24352 | 0 | 0 | 394188 | 141 |
| | | | xxxx12_coptmart_svc | | | | |
| 442813 | 247025 | 28333 | 393 | 0 | 0 | 0 | 0 |
| | | | SYS$USERS | | | | |
| 192991 | 228498 | 178553 | 13835 | 0 | 0 | 14240 | 354 |
| | | | xxxx12_mrp_svc | | | | |
| 316096 | 254024 | 5132 | 1715 | 0 | 0 | 34268 | 17 |
| | | | xxxx12_alrt_svc | | | | |
| 53729 | 35823 | 633 | 21 | 0 | 0 | 1456 | 0 |
| | | | xxxx12_wopt_svc | | | | |
| 122739 | 43639 | 101936 | 6403 | 0 | 0 | 19173 | 8 |
| | | | xxxx121 | | | | |
| 24879 | 8425 | 1410 | 103 | 0 | 0 | 8289 | 2 |
| | | | xxxx12_repl_job_svc | | | | |
| 0 | 0 | 0 | 0 | 0 | 0 | 0 | 0 |
| | | | xxxx12_chnl_svc | | | | |
| 141 | 69 | 73 | 7 | 0 | 0 | 3420 | 2 |
| | | | xxxx12_dtsrpt_svc | | | | |
| 79 | 41 | 3018 | 220 | 0 | 0 | 442 | 1 |

In operation 310, the report is processed to identify critical data and to prepare the presentation to the user in a simple, easy-to-read format. In one embodiment, baseline data is collected to generate a baseline report corresponding to a period where a node in the database is performing satisfactorily, that is, without any known problems. Additionally, a second report is generated when the database is not running effectively, which herein it is referred to as a critical period or a trouble period. Processing the report includes comparing the baseline and the critical data to pin point major differences as markers for identifying where trouble may reside. Without the use of the embodiments of this invention, a database engineer has to manually compare both reports, which is a hard and labor intensive task. Additionally, the database engineer must know, or at least research, which are the critical ranges for data and when the data is outside the normal operating range in order to identify problem markers. By automating this process and putting the intelligence in the tool, less time is spent in comparing the reports and less skilled personnel is needed to identify problems. In the case where multiple nodes are running in a cluster, let us say for example 6 nodes, the engineer has to examine 12 reports: 6 for baseline periods, and 6 for the trouble period. In one embodiment, the tool correlates information from reports associated with different nodes to summarize the information, as described below with respect to FIGS. 5A to 5D.

Figure 4:
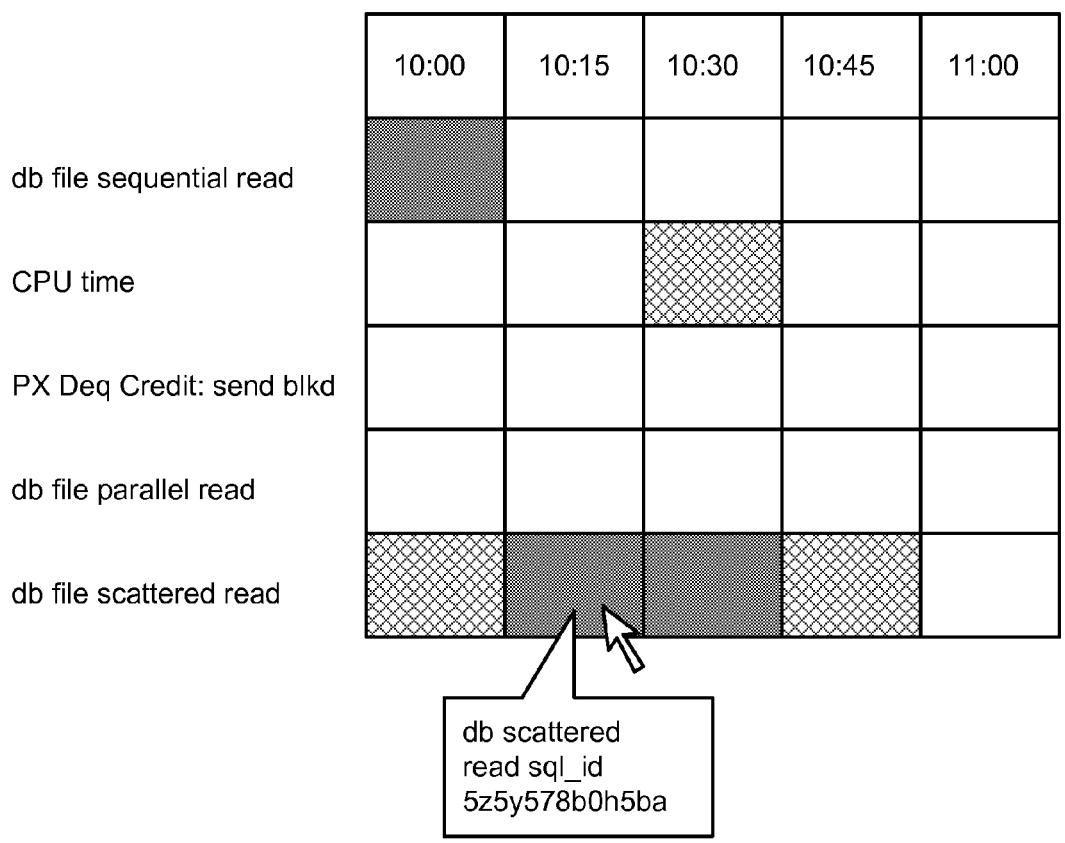
FIG. 4 shows results presented to a user in graphical form after analysis of the database reports, according to one embodiment.

In operation 312, the results are displayed. One example of such display is shown in FIG. 4, where results are presented to a user in graphical form after analysis of the database reports, according to one embodiment. The GUI used for displaying the results, including pain pointing to trouble items, uses rectangular grains of time via different color codings. In one embodiment, three colors are used: green to show normal operation, amber to show performance being slightly degraded, and red corresponding to a period of trouble in the database. In FIG. 4, green is represented as white cells, amber is represented as a crosscheck pattern, and red is represented as solid dark. Other embodiments may use different systems, as long as the data is shown in an easy format. For example, more than three colors can be used to augment the number of levels of criticality. Other embodiment uses different number according to the severity, for example using a scale from 1 to 3, or 1 to 10, or 1 to 100, etc. Words or symbols can also be used, such as for example blank for normal performance, '-' for a warning, and "*" for a critical period.

A typical problem sequence is "green," one or more periods of "amber," one or more periods of "red," one or more periods of amber, and finally back to "green" again. That is, certain problem will cause the criticality to become "amber" as the worsening of a statistical parameter shows performance problems. As the situation worsens, the criticality becomes "red." After a period of time, problems often disappear as the condition causing the problem disappears, causing the situation to become "amber" and later "green" again. The person skilled in the art will readily appreciate that different criteria can be identified to determine what constitutes "green," "amber," or "red" status. For example, the determination can measured as a percentage change from the data in the report without trouble. Another possibility is to identify bands around values associated with a given statistical value to determine the criticality of that statistical value.

In FIG. 4, the columns correspond to different timestamps. In the example shown, the data is analyzed for periods of 15 minutes, but other periods are also possible, such as 10, 20, 30 minutes, etc. The rows correspond to different database metrics, such as wait events in an Oracle 10g database. In one embodiment, more information is given regarding the cause of the pain point as the user rolls the mouse over the corresponding rectangle. This information relates the data that caused the analysis to determine the criticality of the cell.

Figure 5A:
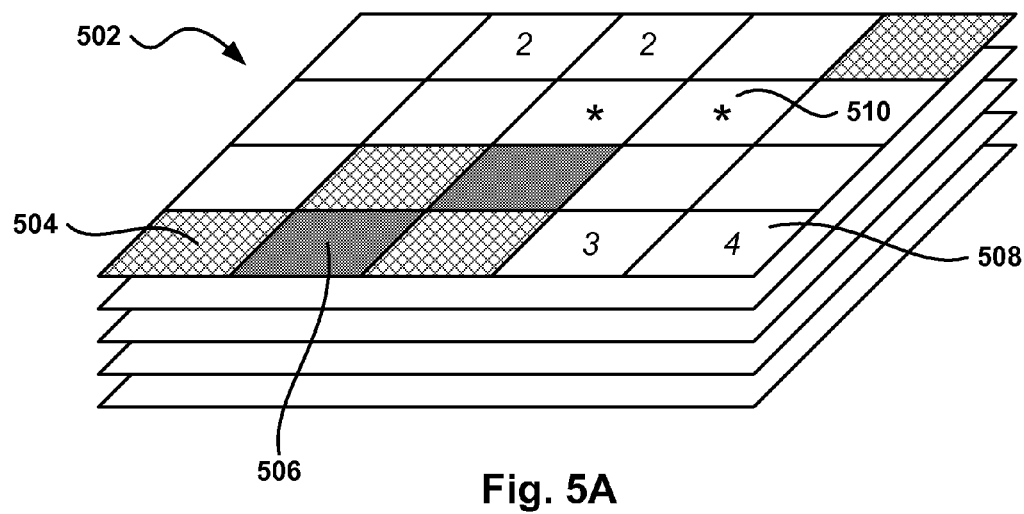
FIGS. 5A to 5D depict different embodiments for summarizing report data.

When dealing with multiple nodes and multiple reports, one embodiment lists the reports from all the nodes in question. In another embodiment, the nodes are presented in order of criticality, the criticality being measured by the number of cells containing a critical rating. Alternatively, the data from multiple nodes can further be consolidated and summarized for the user. In one embodiment, only a predetermined number of tables are shown and the less critical tables are not presented unless the user requests it. FIGS. 5A to 5D depict different embodiments for summarizing report data. FIG. 5A shows summary results table 502 for the four independent node reports below. Summary data can take different forms on the results table. In one embodiment, the results table cell will show a critical result 506, if any of the corresponding cells in the individual tables has a critical value. Similarly, warning call 504 is the result of aggregating the corresponding cells from the individual tables, with one of more of the corresponding cells being at the warning level. In another embodiment, summary cell 508 includes the number of corresponding cells that are not "green." In another embodiment, cell 510 shows an asterisk representing that at least one of the corresponding cells is not in the normal or "green" state. In one embodiment, several reports from the same node, corresponding to same time periods but on different days, are used to summarize data and explore historical trends for the same node. The reports can be from consecutive days, or can be from staggered days, like for example 'every Monday.'

Figure 5B:
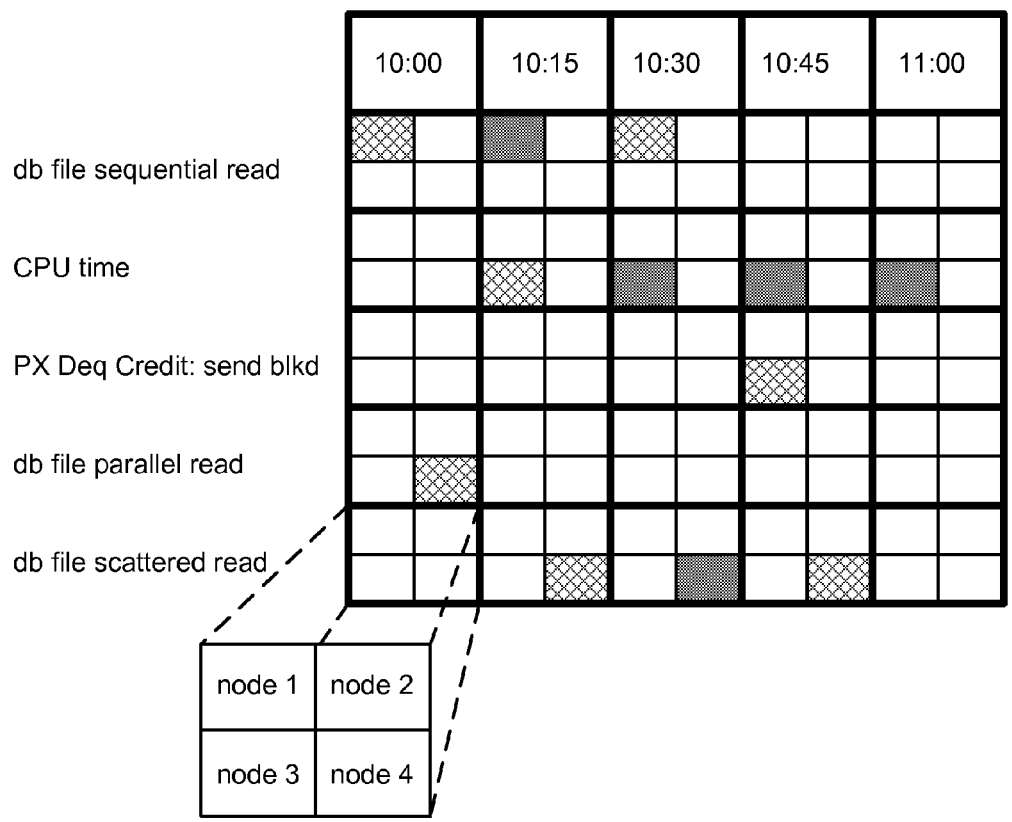

FIG. 5B shows a summary table for 4 separate results tables. Each of the cells in the table includes four sub-cells, where each of the sub-cells corresponds to the data from one of the individual tables. This way, visually identifying the problem areas are is easy, as well as identifying how individual node performance relates to performance in other nodes. For example, if all four nodes where connected to the same faulty network switch, then all nodes would be at a critical state at the same time.

Figure 5C:
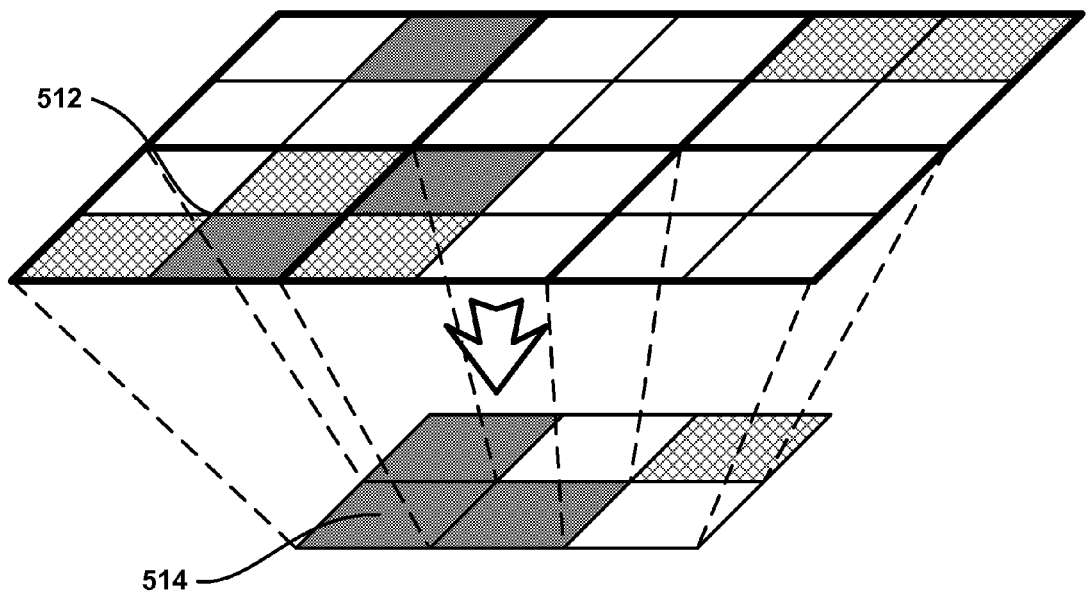

FIG. 5C shows a simplified results table. The data from the original table is aggregated by groups of four cells 512, and an aggregate cell 514 value is obtained. This table is referred to as a zoomed table. The aggregation can be done as explained previously with respect to FIG. 5A. The summary or zoomed table is useful when a large amount of data is being analyzed, simplifying preliminary identification of problem areas. In one embodiment, the user can click on any cell 514, and further details are shown corresponding to the four original cells.

Figure 5D:
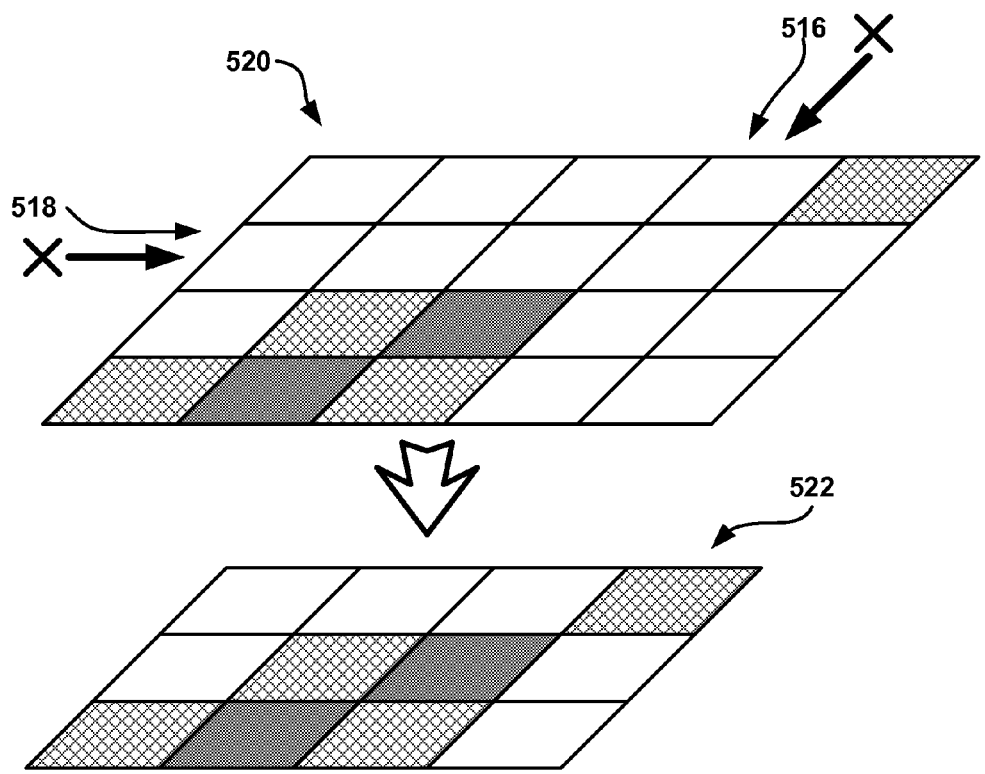

FIG. 5D shows another simplified table according to one embodiment. To create a smaller table, an "empty" row 518 (a row where all cells show as "normal"), or an empty column 516, or both an empty row an empty column can be eliminated to shorten the amount of data presented. Table 522 shows a simplification of table 520 by eliminating row 517 and column 516.

Figure 6:
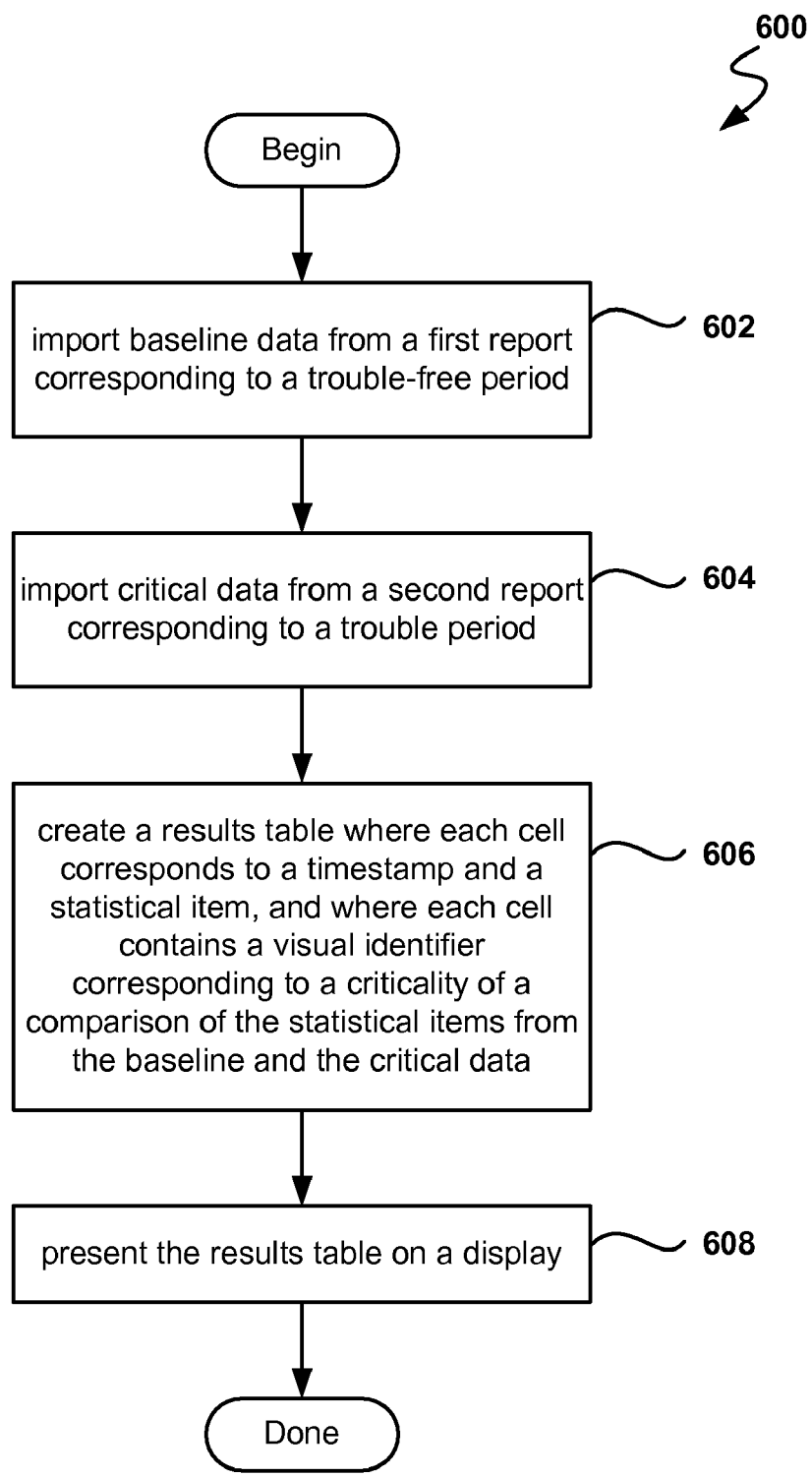
FIG. 6 shows the flow of an algorithm for displaying statistical data in a graphical user interface, in accordance with one embodiment of the invention.

FIG. 6 shows the flow of an algorithm for displaying statistical data in a graphical user interface, in accordance with one embodiment of the invention. In operation 602, baseline data is imported from a first report corresponding to a trouble-free period, that is, a period where the system is performing normally. AWR report tool is an example of a tool to produce reports in Oracle 10g databases. In operation 604, critical data is imported from a second report corresponding to a trouble period, or a period where performance is below minimum acceptable standards.

In operation 606, a results table is created when comparing the two reports. The results table is organized according to two dimensions, a timestamp dimension, and a statistical item dimension. Each cell contains a visual identifier corresponding to a criticality of a comparison of the statistical data from the baseline data, and the statistical data from the critical data. In operation 606, the results table is presented to the user in a GUI. Examples of representations for the GUI are those previously presented with respect to FIGS. 4 to 5D.

Figure 7:
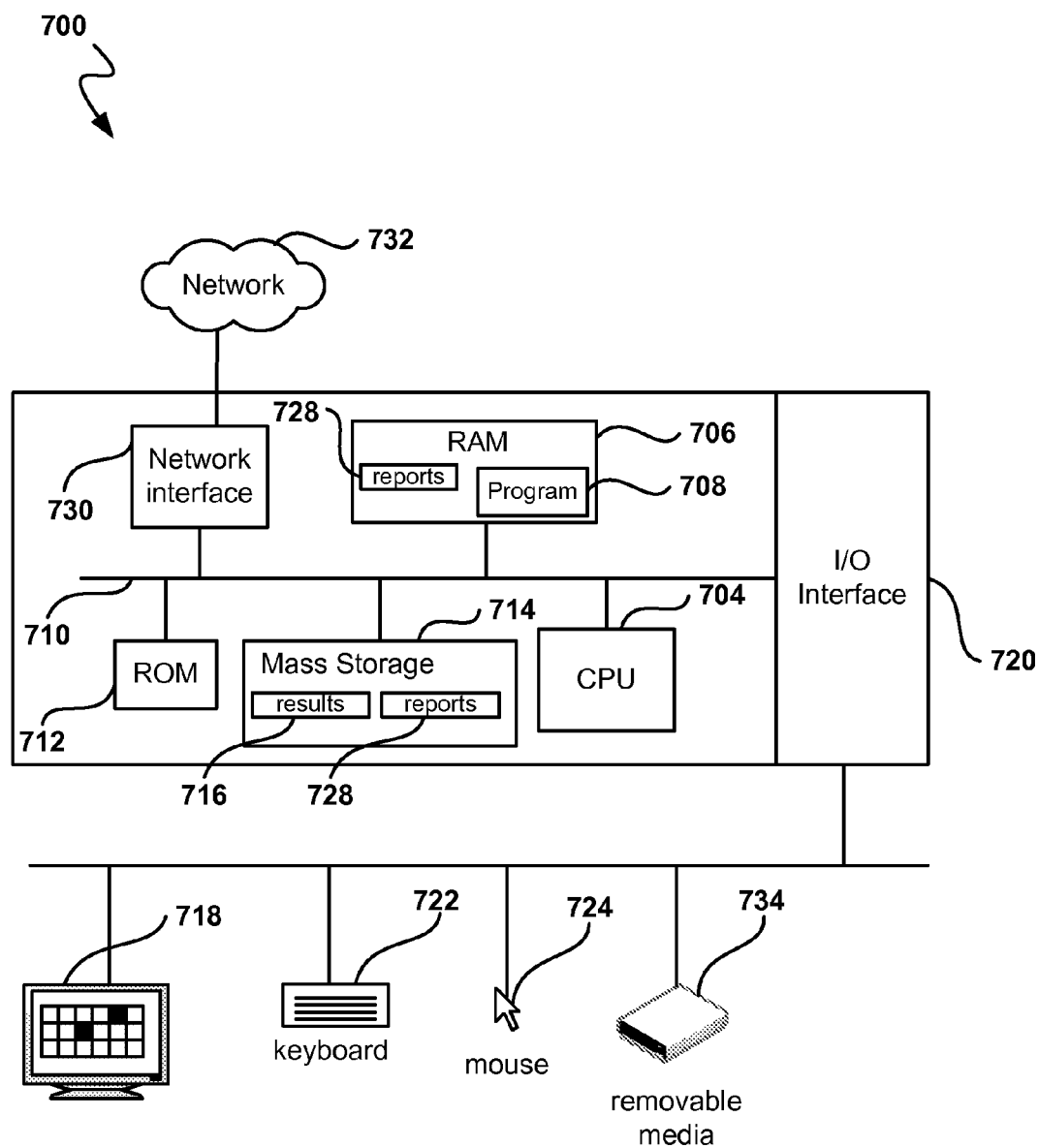
FIG. 7 is a simplified schematic diagram of a computer system for implementing embodiments of the present invention.

FIG. 7 is a simplified schematic diagram of a computer system 700 for implementing embodiments of the present invention. It should be appreciated that the methods described herein may be performed with a digital processing system, such as a conventional, general-purpose computer system. Special purpose computers, which are designed or programmed to perform only one function may be used in the alternative. In addition, the computer system of FIG. 7 may be used to create and analyzes database reports. The computer system includes a central processing unit (CPU) 704, which is coupled through bus 710 to random access memory (RAM) 706, read-only memory (ROM) 712, and mass storage device 714. Report analysis program 708 resides in random access memory (RAM) 706, but can also reside in mass storage 714. Database reports 728 reside in RAM 706 or mass storage 714. Report analysis program 708 generates results 716 that can reside in mass storage 714 or in RAM 706 (not shown).

Mass storage device 714 represents a persistent data storage device such as a floppy disc drive or a fixed disc drive, which may be local or remote. Network interface 730 provides connections via network 732, allowing for the importing of remote database reports. Results and report files reside in mass storage device 714, but can also reside in RAM 706 during processing. It should be appreciated that CPU 704 may be embodied in a general-purpose processor, a special purpose processor, or a specially programmed logic device. Input/Output (I/O) interface provides communication with different peripherals and is connected with CPU 704, RAM 706, ROM 712, and mass storage device 714, through bus 710. Sample peripherals include display 718, keyboard 722, cursor control 724, and removable media device 734.

Display 718 is configured to display the user interfaces described herein. Keyboard 722, cursor control 724, removable media device 734, and other peripherals are coupled to I/O interface 720 in order to communicate information in command selections to CPU 704. It should be appreciated that data to and from external devices may be communicated through I/O interface 720.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for displaying statistical data in a graphical user interface, the method comprising:
   importing baseline data from a first performance report that includes performance data for a first period identified as having satisfactory performance;
   importing critical data from a second performance report that includes performance data for a second period identified as encompassing one or more performance problems;
   creating a plurality of results tables, each result table being associated with a node in a database, wherein each row in the results tables corresponds to a statistical item, each column corresponds to a time period and each cell contains a visual identifier corresponding to a criticality value based on a comparison of statistical items from the baseline and the critical data;
   combining the plurality of results tables into a summary results table, each cell in the summary results table having a criticality value corresponding to a most critical value of the corresponding cells in the plurality of results tables; and
   presenting the summary results table on a display.

2. The computer implemented method as recited in claim 1, wherein the visual identifier is a color associated with the criticality value of the cell.

3. The computer implemented method as recited in claim 1, wherein the criticality value is a finite value associated with a deviation of the statistical item in the critical data from the statistical item in the baseline data.

4. The computer implemented method as recited in claim 1, wherein presenting the summary results table further includes displaying the summary results table by rows and columns.

5. The computer implemented method as recited in claim 1, further including,
   presenting the plurality of results tables on the display.

6. The computer implemented method as recited in claim 5, further including, assigning a table criticality to each of the plurality of results tables, the table criticality being an aggregate for the criticalities of all the cells in the each of the plurality of results tables, and
   sorting the plurality of results tables according to the table criticality before presenting the plurality of results tables.

7. The computer implemented method as recited in claim 6, further including,
   discarding a subset of results tables with a lowest table criticality before presenting the plurality of results tables.

8. The computer implemented method as recited in claim 1, further including, adding to each cell in the summary results table a value representing a number of the corresponding cells in the plurality of results tables with a highest criticality value.

9. A computer program embedded in a non-transitory computer-readable storage medium, when executed by one or more processors, for displaying statistical data in a graphical user interface, the computer program comprising:
program instructions for importing baseline data from a first performance report that includes performance data for a first period identified as having satisfactory performance;
program instructions for importing critical data from a second performance report that includes performance data for a second period identified as encompassing one or more performance problems;
program instructions for creating a plurality of results tables, each result table being associated with a node in a database, wherein each row in the results tables corresponds to a statistical item, each column corresponds to a time period and each cell contains a visual identifier corresponding to a criticality value based on a comparison of statistical items from the baseline and the critical data;
program instructions for combining the plurality of results tables into a summary results table, each cell in the summary results table having a criticality value corresponding to a most critical value of the corresponding cells in the plurality of results tables; and
program instructions for presenting the summary results table on a display.

10. The computer program as recited in claim 9, further comprising,
program instructions for presenting the plurality of results tables on the display.

11. The computer program as recited in claim 9, further including,
program instructions for creating a zoomed results table for a results table by combining pairs of consecutive cells corresponding to a same statistical item into one cell in the zoomed table.

12. The computer program as recited in claim 10,
wherein the database has four nodes,
wherein each cell includes four spaces, and wherein each of the four spaces displays the visual identifier from one of the results tables.

13. The computer program as recited in claim 9, further including,
a computer program including program instructions to automate a creation and presentation of the summary results table.

14. The computer program as recited in claim 9, further including,
program instructions to reduce the results table by eliminating rows where all the cells in the row are trouble-free cells, and
program instructions to reduce the results table by eliminating columns where all the cells in the column are trouble-free cells.

15. A system for displaying statistical data in a graphical user interface, the system comprising:
a computer device having a processor; and
a memory, the memory including,
a first report including baseline database data from a first period identified as having satisfactory performance,
a second report including critical data from a second period identified as encompassing one or more performance problems, and
a report analysis program,
wherein program instructions from the report analysis program when executed by the processor cause the processor to,
create a plurality of results tables in memory, each result table being associated with a node in a database, wherein each row in the results tables corresponds to a statistical item, each column corresponds to a time period and each cell contains a visual identifier corresponding to a criticality value based on a comparison of statistical items from the baseline and the critical data,
combine the plurality of results tables into a summary results table, each cell in the summary results table having a criticality value corresponding to a most critical value of the corresponding cells in the plurality of results tables, and
present the summary results table on a display.

16. The system as recited in claim 15, wherein baseline and critical data is collected every one of ten, fifteen, thirty, or sixty minutes.

17. The system as recited in claim 15, wherein the statistical item is a wait event in a database.

18. The computer implemented method as recited in claim 1, wherein the first performance report and the second performance report correspond to a same time period for different days.

* * * * *